United States Patent [19]

Brusadin et al.

[11] 3,929,288

[45] Dec. 30, 1975

[54] WATER LINE

[75] Inventors: Giacomo Brusadin; Giordano Prosdocimo, both of Pordenone, Italy

[73] Assignee: Uniflex S.p.A., Roveredo in Piano (Pordenone), Italy

[22] Filed: July 22, 1974

[21] Appl. No.: 490,705

[52] U.S. Cl. ............ 239/201; 239/276; 239/288.5
[51] Int. Cl.² .................................... B05B 15/06
[58] Field of Search .......... 239/201, 204, 200, 276, 239/288.5

[56] References Cited
UNITED STATES PATENTS

| | | | |
|---|---|---|---|
| 1,893,210 | 1/1933 | Rider | 239/201 |
| 2,968,440 | 1/1961 | Cone | 239/201 |
| 3,021,078 | 2/1962 | Nickell | 239/201 |
| 3,193,205 | 6/1965 | Hanson | 239/201 |
| 3,589,615 | 6/1971 | Cummins | 239/201 |

FOREIGN PATENTS OR APPLICATIONS 787,687  12/1957  United Kingdom .............. 239/201

Primary Examiner—Evon C. Blunk
Assistant Examiner—Michael Mar
Attorney, Agent, or Firm—Wenderoth, Lind & Ponack

[57] ABSTRACT

A device suitable to form water distribution systems, particularly for gardening, formed with flexible pipe lines of synthetic materials such as rubber or like includes an internally channeled rigid body provided with at least three connections, with a fixing means suitable preferably to fix the body to soil, and by fluid flow controlling means arranged in at least one of the connections.

5 Claims, 9 Drawing Figures

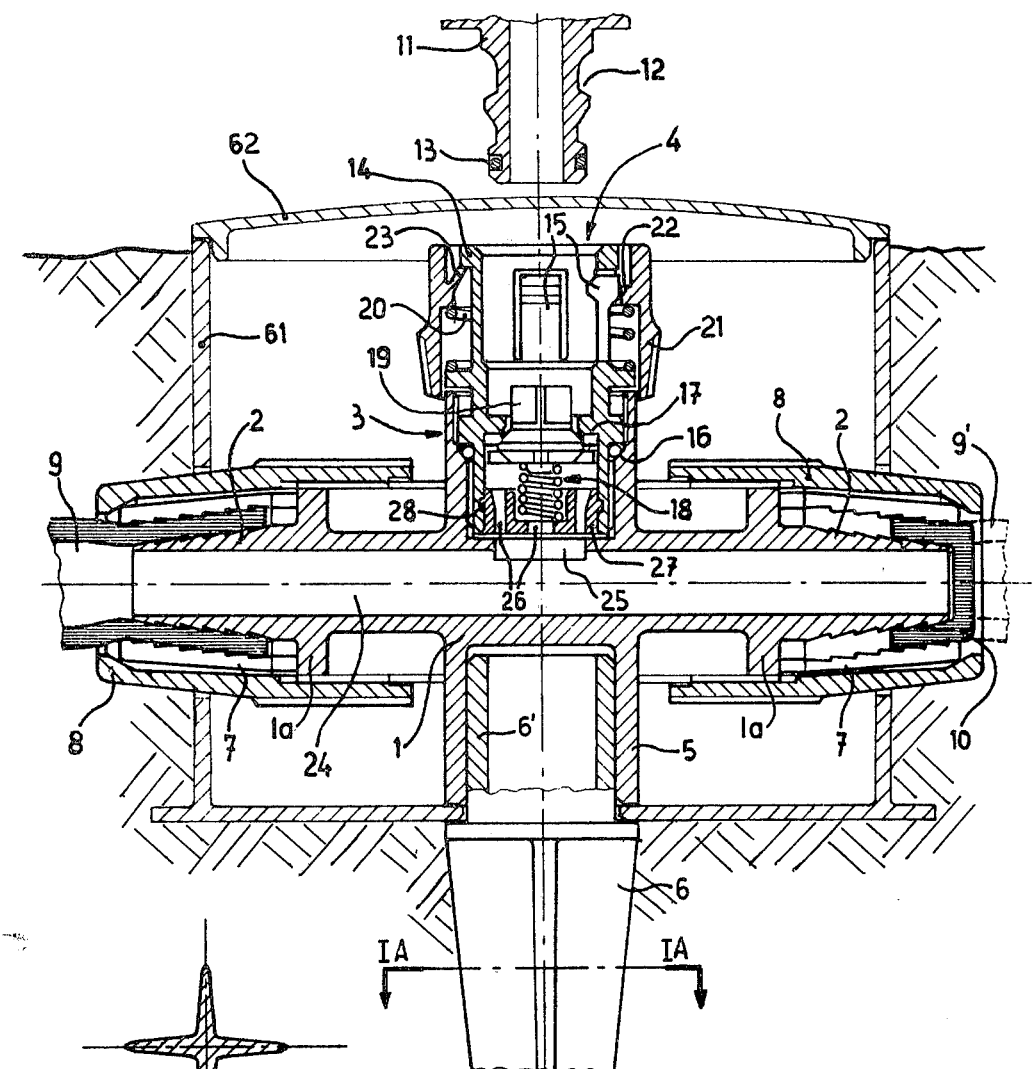
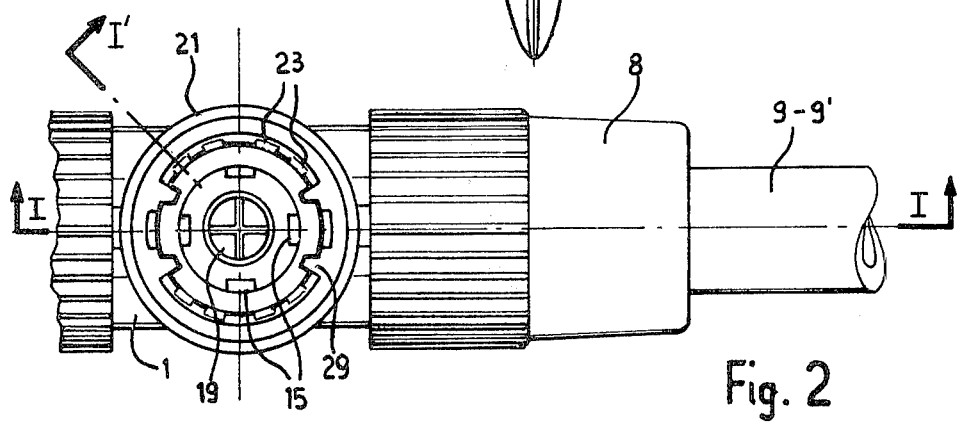
Fig. 1
Fig. 1A
Fig. 2

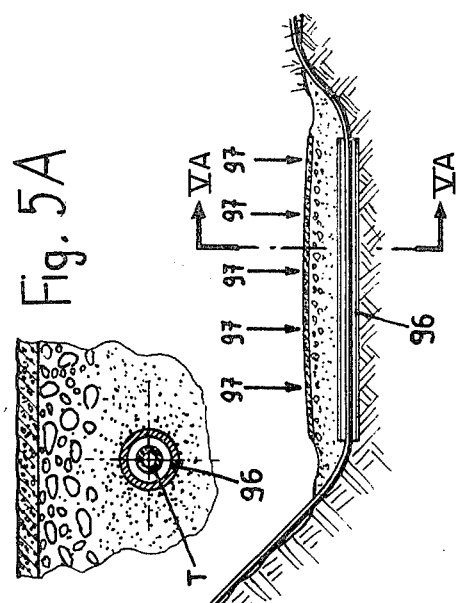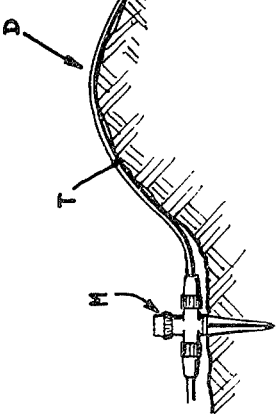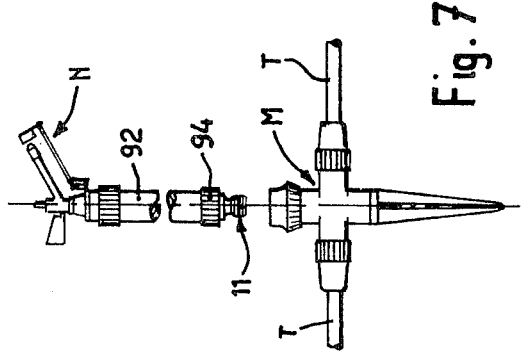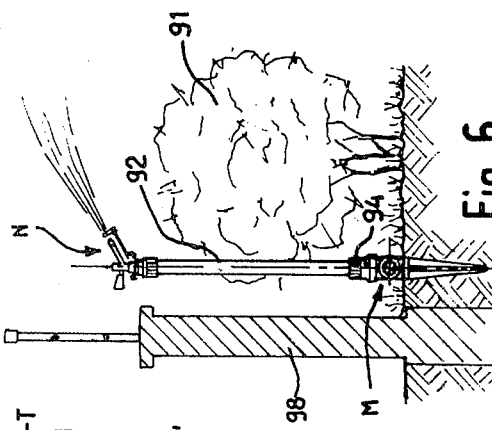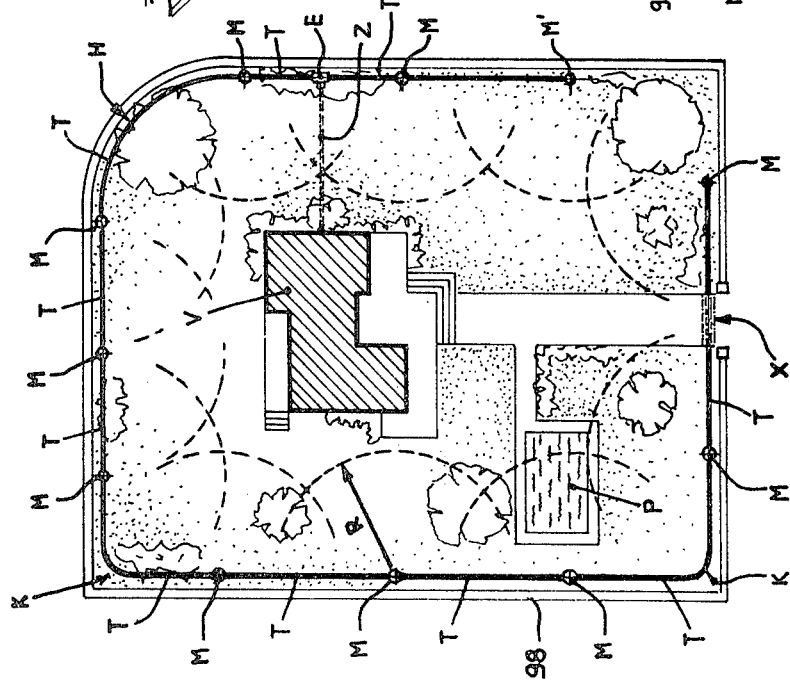

WATER LINE

BACKGROUND OF THE INVENTION

The invention relates to a simple device including a body having two or more planarly placed pipe connections and of an upper connection extending perpendicularly to the former ones. The device allows a rapid and easy construction, with flexible pipes, of water or other fluids distribution systems particularly suitable for gardening. This invention is particularly directed to a device for obtaining fixed water drawing locations. The distribution system thus resulting, made with flexible pipes, can be laid out on the surface of the ground or also completely underground.

Many methods and devices suitable for water distribution system construction are known and already in use. These include traditional systems, using pipes and pipe fittings of metal, usually zinc plated iron, and other systems which utilize tubing, couplings and various apparatus all of plastic materials and which offer the possiblity of using flexible pipe, movable according to necessity.

The use of movable flexible pipe is under certain aspects convenient and economical, but sometimes it requires very long lines and displacement operations whenever new positions are needed, thus often causing many inconveniences. The fixed piping systems, usually underground, require when traditionally constructed with metallic piping, skilled workers and appropriate equipment as well as excavations and their successive refilling, thus involving high costs. The systems using pipings, pipe fittings and other apparatus of plastic materials have the advantage of eliminating skilled labour services, however they present various inconveniences such as cost of various components and utilization of fixed size pipe lines with consequent need for several rather expensive couplings for each single piping system line construction.

Moreover these known methods have been used substantially only in piping systems over flat surfaces, since the possibility of use on surfaces with a variation in slope has not been foreseen. This must be considered somewhat limiting due to the fact that many houses and gardens are placed on mountains or hilly areas, and even for plane surfaces there has developed the trend for making gardens with irregular contours.

SUMMARY OF THE INVENTION

The object of the present invention is to provide a system for avoiding the prior art, because it not only excludes the need for skilled workers for construction, but it also makes possible the formation of different piping systems whether laid out on the ground surface or underground, without limitations of amount of slope or curve of slope.

The present invention also facilitates adding of new connections to the system and a very simple and economical maintenance, especially for those piping systems laid out on the surface, where possible failures can be quickly located and repaired. A piping system laid out on the surface is thus preferably because it is more practical and economical.

Preferably, the piping system will be assembled along a garden perimeter, near an enclosure wall, so as to minimize the esthetic damage to the garden.

The flexible pipe used will be provided with sufficient thickness in order to withstand the internal pressure encountered, and in the case of underground piping execution to resultant external pressure.

Only in the case when the pipe crosses areas where heavy loads may be applied, for example driveways, will it be necessary to provide proper protection outward of the pipe.

BRIEF DESCRIPTION OF THE DRAWINGS

In order that the invention may be more readily understood, certain embodiments thereof are described below, by way of example only, in conjunction with the accompanying drawings, in which:

FIG. 1 is a partial transverse sectional view of the device of the present invention, the view substantially taken along line I—I of FIG. 2, with the left side of the upper projection of the body taken along the line I'–I of FIG. 2;

FIG. 1A is a section taken along line IA—IA of FIG. 1;

FIG. 2 is a plan view of the device;

FIG. 4 is a plan view of a hypothetical garden in which is showed a possible water distribution system utilizing the features of the present invention;

FIG. 5 is a pipe system line over an area of irregular contour and an area over which considerable loads may be applied;

FIG. 5A is a section taken along line VA—VA of FIG. 5;

FIG. 6 is an elevation illustrating the use of a rigid pipe to carry water to an elevated position; and FIG. 7 is an enlarged view of a portion of the device of FIG. 6.

DETAILED DESCRIPTION OF THE INVENTION

Figure 3:
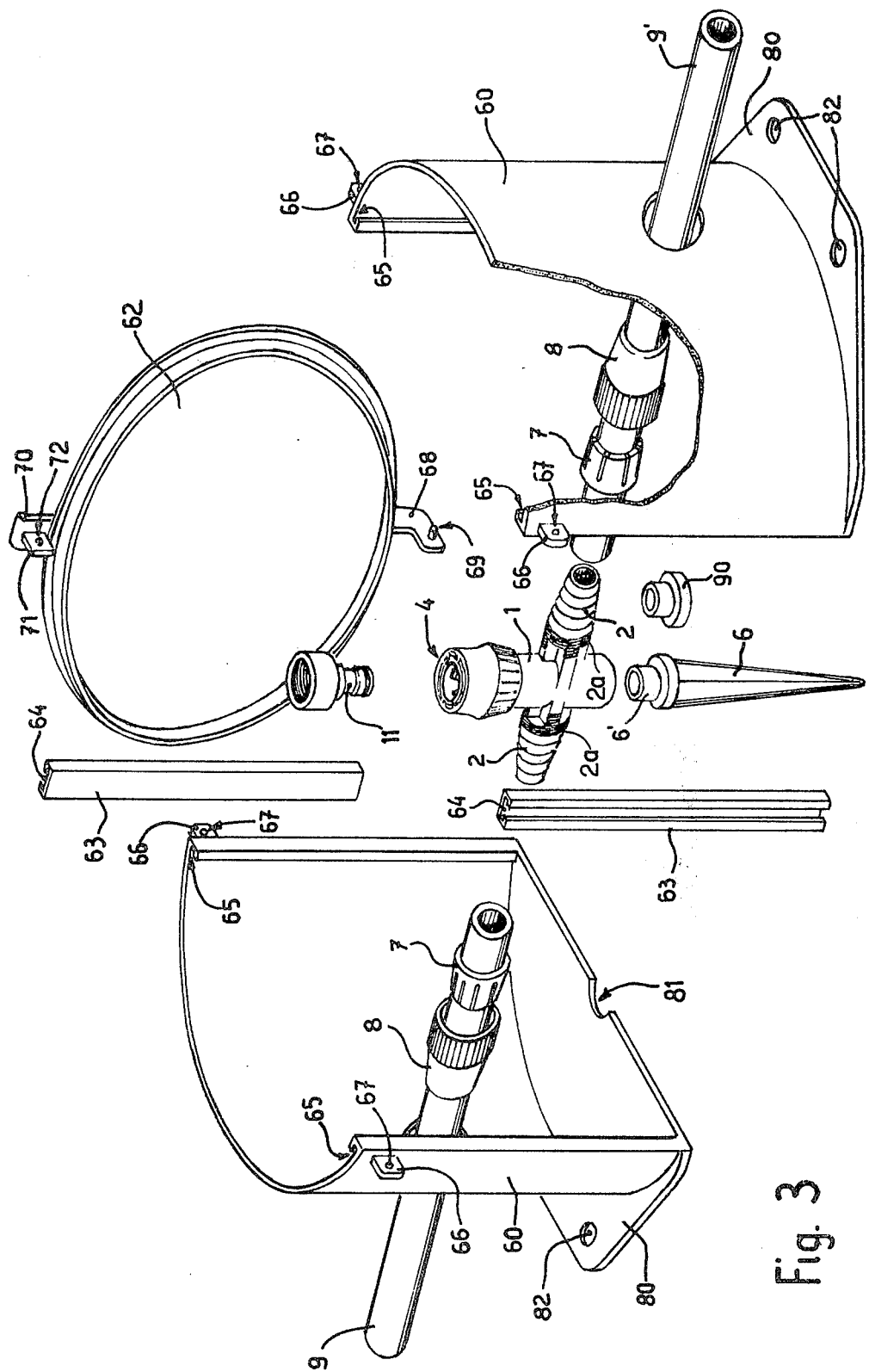
FIG. 3 is a perspective exploded view of the device and including a protection box for underground installations.

Referring now to FIG. 1, the device according to this invention comprises in a preferred embodiment thereof, a body 1, a pair of opposite lateral projections forming pipe connections 2, a central upwardly extending projection 3 having internally thereof a quick release joint 4, and a lower projection 5 into which may be inserted a device for fixing the body in the soil such as the shank 6' of a spike member 6. Elastic elements such as pipes are connected to the frustconical ends of projections 2 by means of elastic ring nuts 7 and vice ring nuts 8 which screw onto threaded cylindrical portions 2a spaced from the ends of projections 2, as best seen in FIG. 3. FIG. 1 illustrates elastic members such as pipes 9 and 9' which may be connected on projections 2. Alternatively, cap 10 may be applied to one of the connections, as shown on the right side of FIG. 1, when the unit is at the terminal end of a piping system.

As shown in the upper part of FIG. 1, a coupling 11 has an annular fixing notch 12 and a gasket 13. Coupling 11 may be joined to various possible utilization devices, such as a sprinkling head. When desired, coupling 11 may be inserted into quick release joint 4 which will lock the coupling 11 in position, thus allowing automatic feeding or distribution through the particular utilization device. The quick release joint 4 is formed by a central generally tubular body 14 extending partially within projection 3 and having plural integral elastic locking jaws 15. An external gasket 16 seals the projection 3 against body 14. An inwardly projecting flange has a gasket 17 forming a sealing valve seat for an automatic valve 19. A spring 18 urges valve 19 against gasket 17 and acts against a bottom part 27 which is snap fit into a slot 28 in body 14. An axially movable control ring nut 21 has an inner annular projection 22 for locking and unlocking jaws 15, and also has elastic antiextraction tongues 23 to prevent removal from body 14. The bottom part 27 is provided with suitable openings 26 to allow water flow therethrough. In FIG. 2, in which the same elements as in FIG. 1 are indicated with the same reference numerals, 29 indicates sliding guides of control ring nut 21.

Hereinafter, the manner of formation and utilization of a water distribution system formed by the above device will be described. After location on the soil of points where automatic distribution and intake by means of the above device are to occur, single flexible pipe lines necessary for connecting the devices are provided, such as by cutting from a roll of pipe. On each of the end parts of the pipe lines are slipped a vice ring nut 8 and then an elastic ring nut 7. The end part of the pipe is slipped over the respective projection or connection 2, then the ring nut 7 is pushed in until it presses the pipe end against the connection and it abuts a stop 1a on. Thereafter, the vice ring nut 8 is screwed onto body 1, thereby obtaining a perfect locking of the pipe to the connection 2. This simple operation will be repeated in order to connect all the previously arranged and located units, which will be finally fixed to the soil by means of their respective spike members. An inlet connection for supplying water to the entire piping system will be provided at some point of the system. Such inlet connection may consist for instance either of T- or Y-shaped fittings with three projections identical to those just described, or of other apparatus of known design and already on the market.

Any terminal unit or units of piping system will be fed through one side only, since the other side connection 2 will be closed by a cap 10, as illustrated in FIG. 1. By the above arrangement, water fed from a single inlet point can supply the entire piping system.

As desired or necessary, a utilization device may be attached to one or more appropriate units. This attachment operation is achieved by pushing down the ring nut 21 of the quick release joint 4, so as to release locking jaws 15 from annular projection 22 of ring nut 21, thus permitting coupling 11 to be slipped into central body 14 of quick release joint 4. Release of ring nut 21 will allow spring 20 to push ring nut 21 to its original position, thus causing jaws 15 to be elastically moved into the annular notch 12 of coupling 11 and locked in position therein by projection 22. As coupling 11 is slipped into body 14, the lower end thereof will contact valve 19 and force automatic valve 19 away from gasket 17, thus causing automatic opening of valve 19. Gasket 13 provides a seal between central body 14 and coupling 11.

Water coming from pipes 9 or 9' will then pass through transversal duct 24 and opening 25 of body 1 and through openings 26 in bottom part 27, then through open valve 19 and coupling 11. Thus, water is fed finally, or by means of a further connection pipe, to the desired utilization device or tool.

For underground pipe systems it will be necessary to protect the units with appropriate protection boxes. Referring again to FIG. 1, there is shown an example of such protection box 61 covered by its closing cover 62.

FIG. 3 shows distinctly a manner of assembly of this unit, in an exploded view. In FIG. 3 there is shown the main body 1 provided with connections 2, the quick release joint 4, the coupling 11 for connection of utilization devices or service tools, the spike member 6 with its shank 6' for connection to main body 1 (shank 6' may be threaded to improve fixing of spike member 6 to the soil and of the box body to the main body 1), flexible pipes 9 and 9', elastic ring nuts 7 and vice ring nuts 8, two half-shells 60 identical to each other and forming the body of box 61 (FIG. 1) and the cover 62. Longitudinal connectors 63 have grooves 64 therein which receive mating projections 65 of the two half-shells 60, to join the two half-shells 60 together in order to assemble the box.

The box carries on the outside of the upper part thereof ears 66 with openings 67. The cover 62 has on one side thereof the ear 68 with two cylindrical projections 69 which are inserted into openings 67 of respective ears 66 to thereby form the hinge of cover 62. On the opposite side cover 62 has a projection 70 including a fin 71 with two hemispheric pins 72 which are inserted between fins 66 of the other side of the box to thereby cause snap-closing of cover 62. The projection 70 acts as a handle for use in opening and closing the cover.

The lower part of the box is formed by plane surfaces 80 each having a semicircular opening 81 permitting the passage therethrough of shank 6 of spike member 6, or of the insertion of a ring nut 90 to fix main body 1 to box 61, and openings 82 for an eventual fixing of the whole ensemble on a prepositioned base.

In FIG. 4 there is shown a preferable layout of a piping system, i.e. perimetrically disposed around a garden. In such arrangement the piping system is placed near an enclosure wall 98, so as to minimize esthetic damage to the garden, even if it is positioned on the surface. In FIG. 4 there is shown a house V, a swimming pool P and the enclosure wall 98. A feed pipe Z (preferably underground or at least out of sight) feeds the system through a suitable joint E. Fixed intakes M and M' are formed by a plurality of devices according to this invention as described above. Because of their disposition at the end of a piping system line, the endmost intakes M and M' will be provided, on the unemployed connections 2 thereof, with a cap 10 (see FIG. 1).

The piping system is substantially formed by flexible pipes T, of synthetic rubber or other synthetic materials, particularly materials resistant to the atmosphere. This usage makes it possible to provide not only more or less rectilinear pipe lines but also widely curved pipe lines H or narrowly curved pipe lines K.

FIG. 4 illustrates also an example of an arrangement of the system in an area where heavy outer loads may be applied, in this case the area X of an avenue of approach, e.g. a driveway. In this case, besides being underground, the pipe must also be protected, for instance by a length of a considerably rigid pipe or by other known systems.

It is clear that if a specific connection joined to a short flexible pipe line is inserted into intakes M or M', it is possible to feed tools located in areas with radius R, indicated by dashed lines.

FIG. 5 shows an arrangement of the piping system on grounds having an irregular contour. It is possible in this case to lay the flexible pipe T over ridges D. Lastly, an area where casual loads may occur (indicated by arrows 97) is shown. In such area the pipe is underground and protected (for instance) by a tubular sheath 96.

FIG. 6 shows a particular solution suitable to distribute water from an intake M, mounted adjacent an obstacle, for instance a bush 91. This is obtained by means of an extension 92 of rigid pipe, carrying at one end a connection 94 terminating with a coupling 11 (see FIG. 7) to be joined to the intake M and connected at the other end to a suitable utilization tool, in this figure being shown by way of example as a known sprayer N with an adjustable, alternative transversely movable jet. In FIG. 6 is also shown the enclosure wall 98 near which is placed the pipe system.

FIG. 7 shows an enlarged more detailed view of the device of FIG. 6.

Although a preferred embodiment of the invention has been fully described in detail, it is obvious that variations and modifications may be made without departing from the scope of the present invention.

We claim:

1. A device for connecting distribution lines and for providing branch points of a water distribution system, said device comprising:
    a box body having an open top and at least two lateral diametrically opposed openings;
    a cover for selectively closing said open top;
    a duct body positioned within said box body, said duct body having:
    at least two lateral projections, one each extending toward one of said lateral openings of said box body;
    a centrally located, vertically upwardly extending projection extending toward said open top of said box body;
    duct means internally of said duct body forming interconnected passages through each of said lateral projections and said vertically upwardly extending projection; and
    a lower downwardly extending projection integral with said duct body;
    nozzle means in said vertically upwardly extending projection for selective coupling thereto of a water utilization device, said nozzle means having therein an automatic valve; and
    supporting means positioned in said downwardly extending projection of said duct body and extending through the bottom of said box body for fixing said box body to the ground.

2. A device as claimed in claim 1, wherein each of said lateral projections has an outer-most frusto-conical end forming means for receiving the end of a length of flexible pipe, and a threaded cylindrical section; and further comprising elastic ring nut means for pressing a pipe end against each said frusto-conical end; and vice ring nut means for threading onto each said threaded cylindrical section and for holding said elastic ring nut means in pressing engagement with said pipe end.

3. A device as claimed in claim 1, wherein said nozzle means comprises a quick release joint.

4. A device as claimed in claim 1, wherein said automatic valve comprises means to close said nozzle means when a water utilization device is not connected thereto and to open said nozzle means when a water utilization device is connected thereto.

5. A device as claimed in claim 1, wherein said box body is formed by a pair of identical half-shell members.

* * * * *